Sept. 5, 1967 G. E. MALLORY 3,339,302
INTERLOCKING PHOTOGRAPH FRAME
Filed Feb. 1, 1966

GARY E. MALLORY
INVENTOR.

BY Lyon & Lyon
ATTORNEYS.

United States Patent Office 3,339,302
Patented Sept. 5, 1967

3,339,302
INTERLOCKING PHOTOGRAPH FRAME
Gary E. Mallory, 37-863 Melrose Drive,
Palm Springs, Calif. 92262
Filed Feb. 1, 1966, Ser. No. 524,228
4 Claims. (Cl. 40—152)

This invention relates to interlocking photograph frames and included in the objects of this invention are:

First, to provide an interlocking photograph frame having a raised rim or margin from which extends a series of outwardly directed tongues disposed parallel to the plane of the frame, the tongues being divided into two groups disposed in offset but contiguous planes and the raised rim having a series of slots so that corresponding groups of slots of each of a pair of frames may be inserted into the slots of the other frame.

Second, to provide an interlocking photograph frame wherein a plurality of frames may be joined to form rows and columns.

Third, to provide an interlocking photograph frame which may be readily separated and rearranged as desired, but which, when joined to form a group of frames, may be handled as a unit, while the frames remain secured in their interlocked condition.

With the above and other objects in view as may appear hereinafter, reference is directed to the accompanying drawings, in which.

Figure 1:
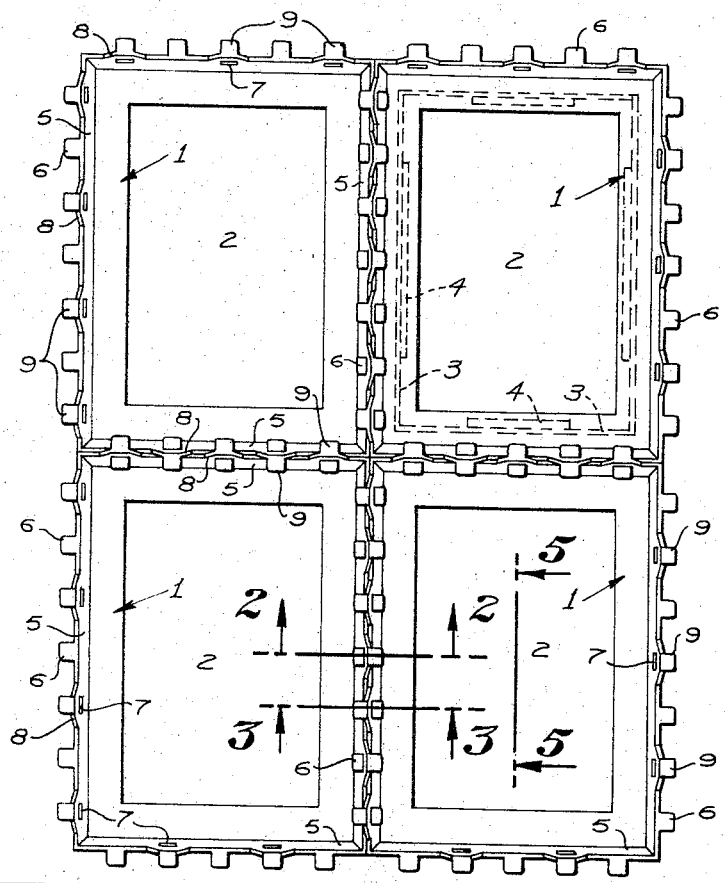
FIGURE 1 is a front view showing four of the interlocking photograph frames joined together.
Figure 2:
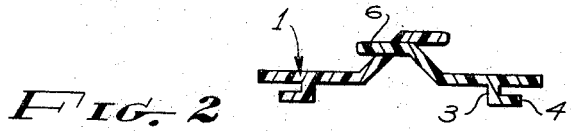
FIGURE 2 is an enlarged sectional view taken through 2—2 of FIGURE 1.
Figure 3:
FIGURE 3 is an enlarged sectional view taken through 3—3 of FIGURE 1.
Figure 4:
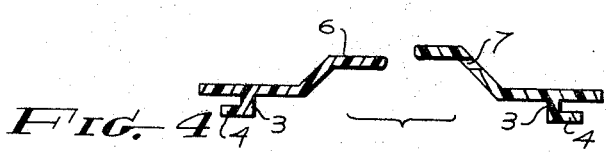
FIGURE 4 is a sectional view similar to FIGURE 3, but showing the two frames separated.
Figure 5:
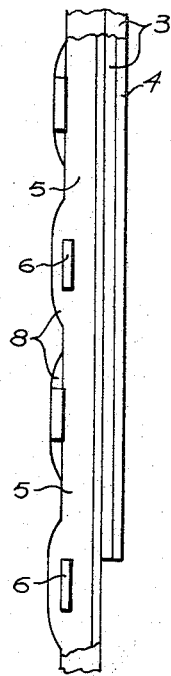
FIGURE 5 is a fragmentary enlarged edge view taken from 5—5 of FIGURE 1.

The interlocking photograph frame is preferably molded from plastic material and includes a flat rectangular frame member 1 defining a central opening 2 intended to expose a photograph. The back side of the frame member is provided with a rectangular photograph centering flange 3 provided at each side with a retaining lip 4 so that a photograph or a photograph and a transparent covering sheet may be held contiguous to the backside of the frame member.

The front side of the frame member is provided with a forwardly extending beveled flange 5. Extending outwardly from the four sides of the front flange 5, is a set of tongues 6 occupying a common plane. The front flange is also provided with a set of slots 7 occupying a plane common to the set of tongues 6 and equally spaced therebetween.

The locations of the set of tongues 6 and set of slots 7 are such that when a pair of frames are placed in alignment side-by-side, or end-to-end, the slots and tongues at the confronting margins of the two frames register with each other so that the tongues of one frame may be inserted in the slots of the other frame, thereby interlocking the frames.

The front flange is provided with a set of rudimentary protrusions 8 overlying the slots 7. Extending from the protrusions 8 is a second set of tongues 9 which define a plane offset from the plane occupied by the set of tongues 6 but contiguous thereto. The tongues 9 serve to guide the tongues 6 into the slots 7 and also reinforce the connection between a pair of frames. In addition, the two sets of tongues cooperate to hold the companion frames in co-planar relation and permit a group of frames to be handled as a unit.

While a particular embodiment of this invention has been shown and described, it is not intended to limit the same to the details of the construction set forth, but instead, the invention embraces such changes, modifications and equivalents of the various parts and their relationships as come within the purview of the appended claims.

I claim:
1. A frame structure for photographs, comprising:
   (a) a rectangular frame defining a central opening;
   (b) means for positioning a photograph in said opening;
   (c) a raised rim bordering said frame and having a set of slots therein defining a common plane parallel to, but offset from said frame;
   (d) a set of tongues extending outwardly from said rim in the same plane as said slots, said tongues and slots being so located as to permit the tongues of one frame structure to enter the slots of a companion frame structure thereby to join said frame structures.

2. A frame structure for photographs according to claim 1, wherein:
   (a) said slots and tongues project from each of the four sides of said frame and rim, and are so disposed that a plurality of said frame structures may be joined to form rows and columns.

3. A frame structure for photographs according to claim 1, wherein:
   (a) said rim is provided with a second set of tongues overlying said set of slots, thereby to overlie the first set of tongues of a companion frame structure.

4. A frame structure for photographs according to claim 1, wherein:
   (a) said raised rim slopes upwardly and outwardly from said frame and includes protrusions overlying said slots;
   (b) and a second set of tongues extend outwardly from said protrusions in a plane offset but contiguous to the plane of said first set of tongues.

References Cited

UNITED STATES PATENTS

| 2,785,487 | 3/1957 | Hopp | 40—16 |
| 3,015,899 | 1/1962 | Ensign et al. | 40—145 |
| 3,070,914 | 1/1963 | Henderson et al. | 40—156 |

FOREIGN PATENTS

| 1,212,875 | 10/1959 | France. |

EUGENE R. CAPOZIO, *Primary Examiner.*
W. J. CONTRERAS, *Assistant Examiner.*